US012175599B1

(12) United States Patent
Hu et al.

(10) Patent No.: US 12,175,599 B1
(45) Date of Patent: Dec. 24, 2024

(54) METHOD AND SYSTEM FOR THREE-DIMENSIONAL (3D) IMAGING OF UNDERGROUND GOAF, AND READABLE STORAGE MEDIUM

(71) Applicants: CHINA UNIVERSITY OF GEOSCIENCES (WUHAN), Wuhan (CN); Institute of Rock and Soil Mechanics, Chinese Academy of Sciences, Wuhan (CN)

(72) Inventors: Yule Hu, Wuhan (CN); Yuyong Jiao, Wuhan (CN); Xuefeng Yan, Wuhan (CN); Zengqiang Han, Wuhan (CN); Yiteng Wang, Wuhan (CN); Luyi Shen, Wuhan (CN); Junpeng Zou, Wuhan (CN); Fei Zheng, Wuhan (CN); Peng Zhang, Wuhan (CN)

(73) Assignees: CHINA UNIVERSITY OF GEOSCIENCES (WUHAN), Wuhan (CN); Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 0 days.

(21) Appl. No.: 18/398,181

(22) Filed: Dec. 28, 2023

(30) Foreign Application Priority Data

Jul. 10, 2023 (CN) .......................... 202310843600.3

(51) Int. Cl.
*G01S 17/48* (2006.01)
*E21C 35/00* (2006.01)
(Continued)

(52) U.S. Cl.
CPC .............. *G06T 17/05* (2013.01); *E21C 39/00* (2013.01); *G06T 7/337* (2017.01); *G06T 7/55* (2017.01);
(Continued)

(58) Field of Classification Search
CPC ... G06T 17/05; G06T 7/55; G06T 7/337; G06T 15/04
(Continued)

(56) References Cited

U.S. PATENT DOCUMENTS 10,436,939 B2 * 10/2019 Ward .................. G06T 17/05
11,049,316 B2 * 6/2021 Yamanaka ............ G06T 15/503
(Continued)

FOREIGN PATENT DOCUMENTS

KR 2039863 B1 * 11/2019 ............. G01D 21/02
KR 2396675 B1 * 5/2022
TW 786802 B1 * 12/2022

OTHER PUBLICATIONS

Beatriz Batista Cardoso et al., "The use of GPR technologies for utility mapping in underground distribution grid conversion—Brazil use case", 2021 IEEE.*

*Primary Examiner* — Javid A Amini
(74) *Attorney, Agent, or Firm* — True Shepherd LLC; Andrew C. Cheng

(57) ABSTRACT

A method for three-dimensional (3D) imaging of an underground goaf includes: obtaining a video image and point cloud data of an underground goaf; determining a posture transformation matrix, and aligning the video image and the point cloud data; identifying a material texture based on the video image to obtain material texture information; dividing the point cloud data into triangular meshes to form an initial 3D model of the underground goaf; mapping the material texture information onto the 3D model to form a target 3D model with a material texture attribute; calculating a bidirectional reflectance distribution function (BRDF) of the target 3D model based on the material texture attribute; simulating global illumination, and constructing a rendering equation; and making a setting to emit ray from a viewpoint, (Continued)

and performing ray tracing based on the rendering equation to obtain a high-brightness real scene image of the underground goaf.

8 Claims, 3 Drawing Sheets

(51) Int. Cl.
| | |
|---|---|
| *E21C 39/00* | (2006.01) |
| *G06T 7/33* | (2017.01) |
| *G06T 7/55* | (2017.01) |
| *G06T 15/04* | (2011.01) |
| *G06T 15/06* | (2011.01) |
| *G06T 15/50* | (2011.01) |
| *G06T 15/55* | (2011.01) |
| *G06T 17/05* | (2011.01) |
| *G06T 17/20* | (2006.01) |

(52) U.S. Cl.
CPC .............. *G06T 15/04* (2013.01); *G06T 15/06* (2013.01); *G06T 15/506* (2013.01); *G06T 15/55* (2013.01); *G06T 17/20* (2013.01); *G06T 2207/10016* (2013.01); *G06T 2207/10028* (2013.01); *G06T 2207/20081* (2013.01); *G06T 2207/20084* (2013.01); *G06T 2210/56* (2013.01); *G06T 2215/12* (2013.01)

(58) Field of Classification Search
USPC ......................................................... 345/420
See application file for complete search history.

(56) References Cited

U.S. PATENT DOCUMENTS

| | | | |
|---|---|---|---|
| 11,354,855 B2* | 6/2022 | Ganihar | G06T 17/20 |
| 2011/0199860 A1* | 8/2011 | Houck | G01V 1/301 |
| | | | 367/72 |
| 2012/0014217 A1* | 1/2012 | Houck | G01V 1/308 |
| | | | 367/72 |
| 2012/0014218 A1* | 1/2012 | Houck | G01V 1/308 |
| | | | 367/72 |
| 2014/0313502 A1* | 10/2014 | Steele | E21B 7/022 |
| | | | 356/4.01 |
| 2016/0116635 A1* | 4/2016 | Ward | G01V 20/00 |
| | | | 703/2 |
| 2016/0170085 A1* | 6/2016 | Ward | G06T 17/05 |
| | | | 703/2 |
| 2016/0170086 A1* | 6/2016 | Ward | G06T 17/05 |
| | | | 703/10 |
| 2018/0189611 A1* | 7/2018 | Dal Mutto | G06F 18/24 |
| 2019/0387356 A1* | 12/2019 | Branscomb | H04W 12/64 |
| 2023/0343029 A1* | 10/2023 | Wang | G06N 20/00 |

* cited by examiner

METHOD AND SYSTEM FOR THREE-DIMENSIONAL (3D) IMAGING OF UNDERGROUND GOAF, AND READABLE STORAGE MEDIUM

CROSS-REFERENCE TO RELATED APPLICATIONS

This application claims priority to Chinese Patent Application No. 202310843600.3 with a filing date of Feb. 7, 2021. The content of the aforementioned application, including any intervening amendments thereto, is incorporated herein by reference.

TECHNICAL FIELD

The present disclosure relates to the technical field of exploration in underground goafs, and specifically, to a method and system for three-dimensional (3D) imaging of an underground goaf, and a readable storage medium.

BACKGROUND

Coal is a main energy source in China, and the development of the state economy is closely related to coal mining. In today's rapidly developing economy, coal resources are being exploited on a large scale. An open stope mining method is used for more than half of coal mines in China, with a remaining goaf of up to 2S billion cubic meters. No perfect management and recording are performed in early stages of coal mining, resulting in an unclear location distribution of many goafs. This is harmful to society, and imposes an adverse impact on an environment. In addition, people's life safety may be directly affected, bringing a huge loss to the country.

Therefore, exploration of a coal mine goaf is crucial for stable development of China, and conducting research on a technology for exploring an underground goaf is of great significance for safety production of a mine. At present, there are two methods for exploring the coal mine goaf: an indirect method and a direct method. The indirect method mainly refers to various geophysical techniques, including strong-gravity, earthquake, electromagnetic, radioactive, and comprehensive geophysical exploration methods and techniques. The direct method mainly refers to various geological drilling methods, including exploration while drilling, geophysical logging, underground goaf scanning, and other methods and techniques. A geophysical method is a relatively economical and fast technical means for exploring the coal mine goaf, which can efficiently and quickly explore a large-scale underground goaf. However, the geophysical method is affected by other factors and may have a plurality of interpretation results, and reliability of data interpretation depends heavily on a professional technical level of geophysical personnel. As a result, the geophysical method has low goaf exploration precision, and is only suitable for large-scale preliminary exploration. As the current most traditional method for exploring an underground goaf, the geological drilling method has high exploration precision. However, due to a long construction cycle, a high cost, and a small exploration range, the geological drilling method is only suitable for exploring a small-scale underground goaf.

In summary, it can be determined that both the geophysical method and the geological drilling method can only obtain some simple characteristics of the underground goaf, such as a location and a volume of the goaf, and cannot obtain a 3D form and an internal real scene of the underground goaf in real time. As a result, a 3D imaging effect of the underground goaf is poor.

SUMMARY OF PRESENT INVENTION

Embodiments of the present disclosure are intended to provide a method and system for 3D imaging of an underground goaf, and a readable storage medium, to improve a 3D imaging effect of an underground goaf.

The embodiments of the present disclosure provide a method for 3D imaging of an underground goaf, including the following steps:

S1, obtaining a video image and point cloud data of an underground goaf;

S2, determining a posture transformation matrix, and aligning the video image of the underground goaf and the point cloud data of the underground goaf based on the posture transformation matrix;

S3, identifying a material texture based on the video image of the underground goaf to obtain material texture information;

S4, dividing the point cloud data of the underground goaf into triangular meshes to form an initial 3D model of the underground goaf;

S5, mapping the material texture information onto the 3D model of the underground goaf to form a target 3D model with a material texture attribute for the underground goaf;

S6, calculating a bidirectional reflectance distribution function (BRDF) of the target 3D model of the underground goaf based on the material texture attribute;

S7, simulating global illumination, and constructing a rendering equation based on the obtained BRDF; and S8, making a setting to emit a ray from a viewpoint, and performing ray tracing based on the rendering equation to obtain a high-brightness real scene image of the underground goaf.

According to a second aspect, the embodiments of the present disclosure further provide a system for 3D imaging of an underground goaf, including a data obtaining module, a posture alignment module, a material texture identification module, a 3D reconstruction module, and a 3D imaging module;

the data obtaining module is configured to obtain a video image and point cloud data of an underground goaf;

the posture alignment module is configured to determine a posture transformation matrix, and align the video image of the underground goaf and the point cloud data of the underground goaf based on the posture transformation matrix;

the material texture identification module is configured to identify a material texture based on the video image of the underground goaf to obtain material texture information;

the 3D reconstruction module is configured to divide the point cloud data of the underground goaf into triangular meshes to form an initial 3D model of the underground goaf, the 3D reconstruction module is further configured to map the material texture information onto the 3D model of the underground goaf to form a target 3D model with a material texture attribute for the underground goaf;

the 3D imaging module is configured to calculate a BRDF of the target 3D model of the underground goaf based on the material texture attribute; the 3D imaging module is further configured to simulate global illumination, and construct a rendering equation based on the obtained BRDF; and the 3D imaging module is further configured to make a setting to emit a ray from a viewpoint, and perform ray tracing based on the rendering equation to obtain a high-brightness real scene image of the underground goaf.

According to a third aspect, the embodiments of the present disclosure further provide a readable storage medium. The readable storage medium includes a method program for 3D imaging of an underground goaf. The method program for 3D imaging of an underground goaf is executed by a processor to perform the steps of the foregoing method for 3D imaging of an underground goaf.

From the above, it can be seen that the method and system for 3D imaging of an underground goaf, and the readable storage medium provided in the embodiments of the present disclosure can generate a real-time 3D model of an underground goaf through joint imaging of a point cloud and a video image, to reflect a 3D contour and a real scene of the underground goaf. In addition, material texture identification is performed to further improve imaging precision and provide a good data foundation for subsequent 3D modeling, thereby achieving accurate texture mapping. Moreover, global illumination is also simulated, and ray tracing is performed based on an obtained rendering equation. This can greatly increase a calculation speed, save computing power, generate an image more quickly and in real time, and improve a 3D imaging effect of the underground goaf.

Other features and advantages of the present disclosure will be described in the following specification, and some of these will become apparent from the specification or be understood by implementing the present disclosure. The objectives and other advantages of the present disclosure can be implemented or obtained by structures specifically indicated in the written specification, claims, and accompanying drawings.

BRIEF DESCRIPTION OF THE DRAWINGS

To describe the technical solutions in the embodiments of the present disclosure clearly, the accompanying drawings required in the embodiments of the present disclosure are briefly described below. It should be understood that, the following accompanying drawings show merely some embodiments of the present disclosure, and thus should not be regarded as a limitation to the scope of the present disclosure. A person of ordinary skill in the art may still derive other related accompanying drawings from these accompanying drawings without creative efforts.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some rather than all of the embodiments of the present disclosure. Generally, the components described and shown in the accompanying drawings of the embodiments of the present disclosure may be provided and designed in various manners. Therefore, the detailed description of the embodiments of the present disclosure with reference to the accompanying drawings is not intended to limit the protection scope of the present disclosure, but merely to represent the selected embodiments of the present disclosure. All other embodiments obtained by those of ordinary skill in the art based on the embodiments of the present disclosure without creative efforts should fall within the protection scope of the present disclosure.

It should be noted that similar reference signs and letters represent similar items in the accompanying drawings below. Therefore, once an item is defined in one accompanying drawing, it does not need to be further defined and described in subsequent accompanying drawings. In addition, in the description of the present disclosure, the terms such as "first" and "second" are used only for distinguishing, rather than to indicate or imply relative importance.

Figure 1:
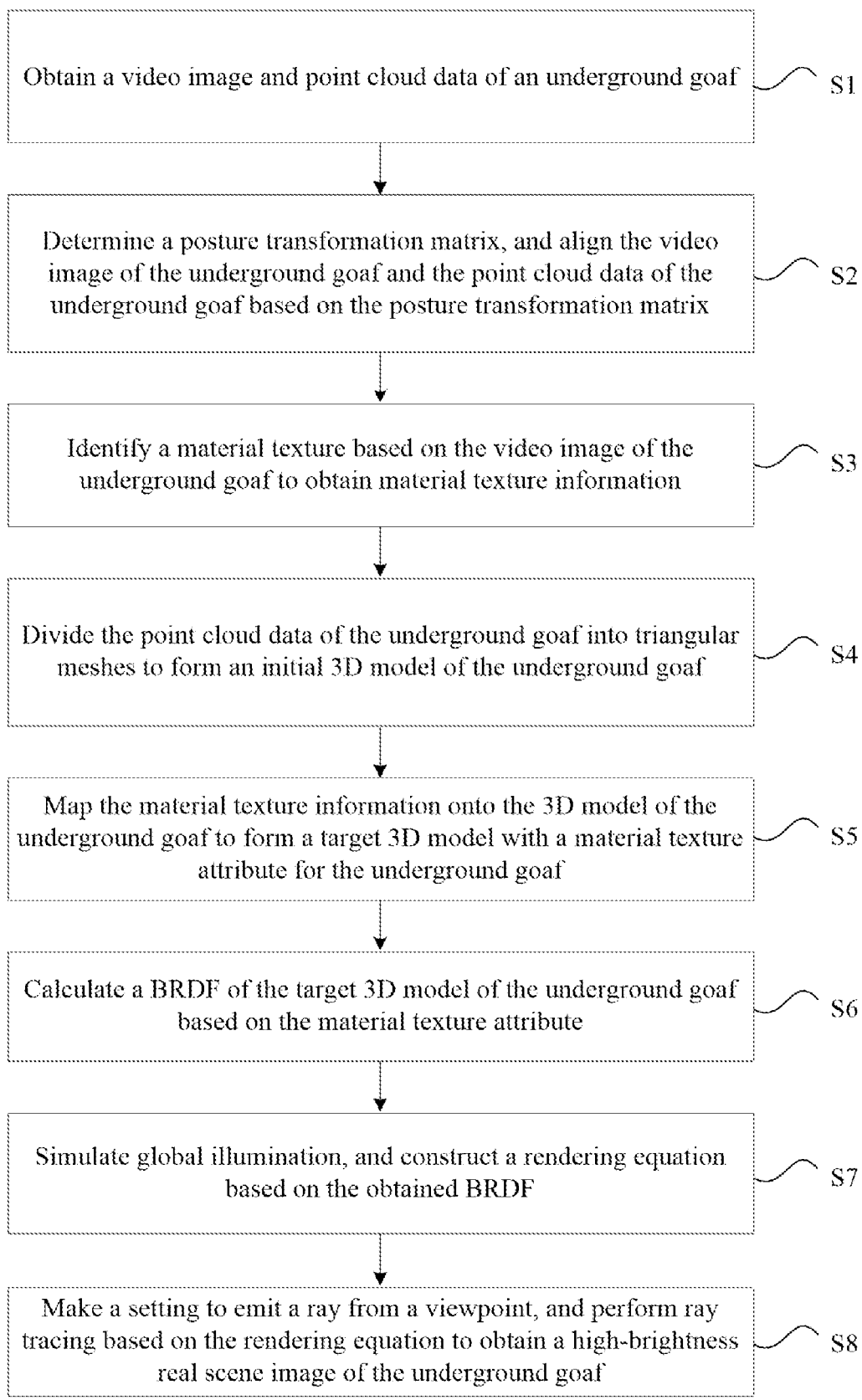
FIG. 1 is a flowchart showing a method for 3D imaging of an underground goaf according to an embodiment of the present disclosure.

FIG. 1 is a flowchart showing a method for 3D imaging of an underground goaf according to some embodiments of the present disclosure. The method includes the following steps:

In step S1, a video image and point cloud data of an underground goaf are obtained.

In step S2, a posture transformation matrix is determined, and the video image of the underground goaf and the point cloud data of the underground goaf are aligned based on the posture transformation matrix.

In step S3, a material texture is identified based on the video image of the underground goaf to obtain material texture information.

In step S4, the point cloud data of the underground goaf is divided into triangular meshes to form an initial 3D model of the underground goaf.

In step S5, the material texture information is mapped onto the 3D model of the underground goaf to form a target 3D model with a material texture attribute for the underground goaf.

In step S6, a BRDF of the target 3D model of the underground goaf is calculated based on the material texture attribute.

In step S7, global illumination is simulated, and a rendering equation is constructed based on the obtained BRDF.

In step S8, a setting is made to emit a ray from a viewpoint, and ray tracing is performed based on the rendering equation to obtain a high-brightness real scene image of the underground goaf.

From the above, it can be seen that the method for 3D imaging of an underground goaf disclosed in the present disclosure can generate a real-time 3D model of an underground goaf through joint imaging of a point cloud and a video image, to reflect a 3D contour and a real scene of the underground goaf. In addition, material texture identification is performed to further improve imaging precision and provide a good data foundation for subsequent 3D modeling, thereby achieving accurate texture mapping. Moreover, global illumination is also simulated, and ray tracing is performed based on an obtained rendering equation. This can greatly increase a calculation speed, save computing power, generate an image more quickly and in real time, and improve a 3D imaging effect of the underground goaf.

Figure 2:
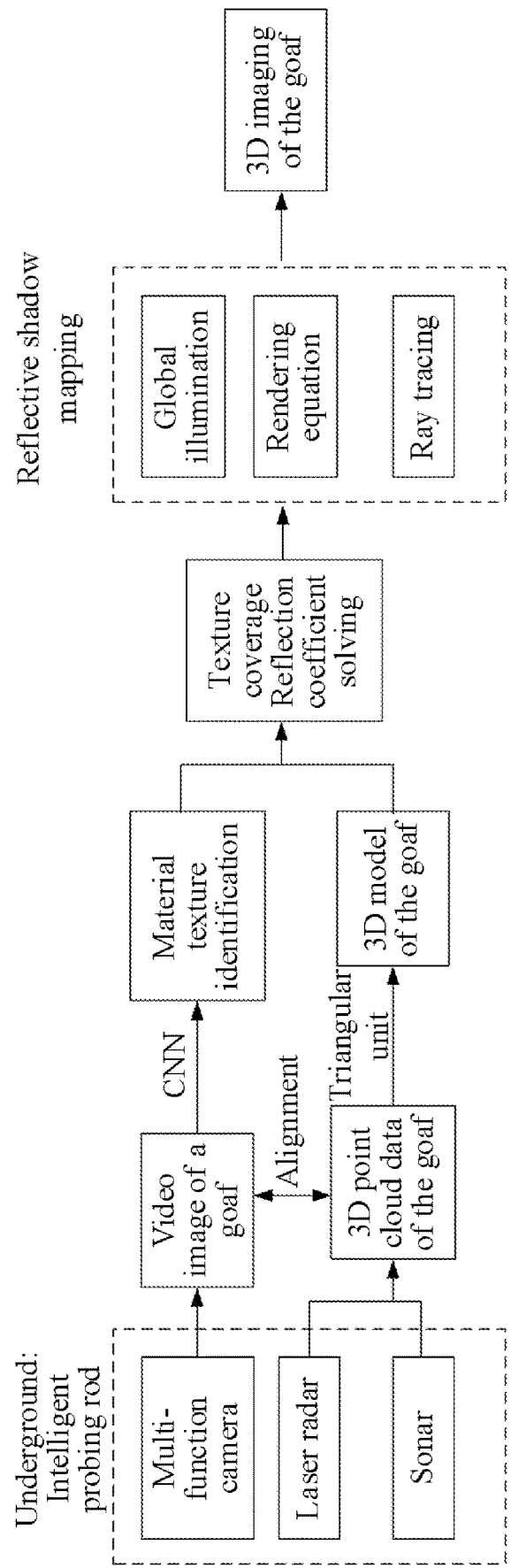
FIG. 2 is a general flowchart showing implementing a method for 3D imaging of an underground goaf according to an embodiment of the present disclosure.

In an embodiment, referring to FIG. 2, in the step S1, the video image of the underground goaf is collected by a camera, and the point cloud data of the underground goaf is collected by a laser radar and a sonar.

In an embodiment, the step S2 of determining the posture transformation matrix, and aligning the video image of the underground goaf and the point cloud data of the underground goaf based on the posture transformation matrix includes the following substeps:

In step S2.1, the video image of the underground goaf and the point cloud data of the underground goaf are preprocessed to obtain a target image and target point cloud data respectively.

Specifically, the preprocessing of the video image of the underground goaf includes at least one of cropping, distorting, or resizing the image to determine that geometric information of the image matches the point cloud data of the underground goaf. The preprocessing of the point cloud data of the underground goaf includes at least one of filtering, denoising, or downsampling a point cloud to improve a matching effect and computational efficiency.

In step S2.2, a plurality of image feature descriptors are extracted from the target image, and a plurality of point cloud feature descriptors are extracted from the target point cloud data.

Specifically, in the current embodiment, the image feature descriptors are extracted from the target image based on a feature extraction algorithm. The feature extraction algorithm includes at least one of a scale invariant feature transform (SIFT) algorithm, a speeded up robust features (SURF) algorithm, and an Oriented FAST and Rotated BRIEF (ORB) algorithm.

Specifically, in the current embodiment, at least one of a normal, a curvature, and other features of the target point cloud data is extracted, and these features are used as point cloud feature descriptors.

In step S2.3, feature matching is performed on each of the image feature descriptors and each of the point cloud feature descriptors through feature correlation to obtain a feature matching pair.

Specifically, in the current embodiment, a feature matching algorithm is used to perform, through the feature correlation, the feature matching on the feature descriptors extracted in the step S2.3 to obtain the feature matching pair. In an embodiment, the feature matching algorithm includes at least one of a nearest neighbor matching algorithm and a random sample consensus (RANSAC) algorithm.

In step S2.4, a posture transformation matrix of the camera is estimated based on the feature matching pair.

Specifically, the posture transformation matrix of the camera is estimated with reference to a perspective-n-points (PnP) algorithm based on a matched feature pair.

In step S2.5, posture alignment is performed on the target image and the target point cloud data based on the posture transformation matrix.

Specifically, the obtained posture transformation matrix can be applied to the target point cloud data to project the target point cloud data into image space to align a projection point and a corresponding pixel in the target image. For another example, the obtained posture transformation matrix can also be applied to the target image to transform coordinates of each pixel in the target image into point cloud space to align an image transformation point and a corresponding point in the target point cloud data.

In the above embodiments, the video image of the underground goaf and the point cloud data of the underground goaf are aligned before 3D reconstruction. This helps to improve model reconstruction precision and provides a good data foundation for subsequent 3D imaging of the underground goaf.

In an embodiment, referring to FIG. 2, the step S3 of identifying the material texture based on the video image of the underground goaf to obtain the material texture information includes the following substeps:

In step S3.1, an image dataset containing different material textures is obtained, and a training set and a verification set are constructed based on the image dataset.

Specifically, after collecting the image dataset containing different material textures, the present disclosure also labels each image sample in the image dataset with a corresponding material category, and ensures that the image samples in the image dataset can cover as many different material types and texture features as possible.

In step S3.2, an initial convolutional neural network (CNN) is constructed, the training set is input into the initial CNN for model training, and a target CNN is obtained at the end of the training.

Specifically, in the current embodiment, a CNN is used to construct the initial CNN.

It should be noted that the CNN is a neural network specifically designed for an image identification task, and typically includes a plurality of convolutional layers, pooling layers, and fully connected layers. In specific implementation, an appropriate CNN model architecture such as LeNet, AlexNet, VGG, or ResNet can be selected based on task complexity and an available computing resource. Currently, there is no limitation on a model architecture selected for the initial CNN.

In step S3.3, a performance indicator of the target CNN is evaluated based on the verification set, and model tuning is performed based on an obtained indicator evaluation result.

Specifically, the performance indicator includes at least one of classification accuracy, classification precision, and a classification recall rate. The model tuning is performed based on the obtained indicator evaluation result.

For example, when it is determined that the classification accuracy is less than a preset threshold, the model tuning can be performed by adjusting a structure and a hyperparameter of a model, or by using another technical means. Other situations can be analogized based on this example, which is not described again at present.

In step S3.4, the video image of the underground goaf is input into an obtained tuned model for processing, and the material texture information is determined based on an obtained output result.

Specifically, after the model training and tuning, the currently obtained tuned model can be applied to identifying the material texture information.

In the above embodiments, the CNN is selected to identify the material texture information in the video image of the underground goaf. The imaging precision is further improved based on a self-learning characteristic of the neural network to provide the good data foundation for the subsequent 3D modeling, thereby achieving the accurate texture mapping.

In an embodiment, referring to FIG. 2, the step S4 of dividing the point cloud data of the underground goaf into the triangular meshes to form the 3D model of the underground goaf includes the following substeps:

In step S4.1, the point cloud data of the underground goaf is preprocessed to obtain the target point cloud data.

Specifically, the preprocessing of the point cloud data of the underground goaf includes removing an outlier or noise. In an embodiment, this can be achieved through filtering, sampling, or other point cloud processing algorithms, to obtain cleaner and more uniform point cloud data.

In step S4.2, the target point cloud data is triangulated to generate an initial triangulated network including a plurality of triangular meshes.

Specifically, the triangulation of the target point cloud data includes: using a Delaunay triangulation algorithm to generate non-overlapping triangles with a minimum angle maximized on the point cloud. In an embodiment, Delaunay triangulation can be implemented by using an existing library or tool, such as a computational geometry algorithms library (CGAL) or a triangulation algorithm.

In step S4.3, each of the triangular meshes is traversed. During the traversal, when it is determined that a currently traversed mesh does not meet a preset quality condition and/or boundary condition, a mesh optimization algorithm is called to optimize quality of the mesh and/or a boundary processing algorithm is called to process a boundary of the mesh.

Specifically, when it is determined that the currently traversed mesh does not meet the preset quality condition, in other words, the generated triangular mesh includes a low-quality triangle that may be, for example, a long and narrow triangle or a twisted triangle, the mesh optimization algorithm is used to improve a shape of the triangle in the mesh to improve the quality of the mesh. In an embodiment, the mesh optimization algorithm includes at least one of a Laplacian smoothing algorithm, an algorithm for optimizing minimum deformation energy, and the like.

Specifically, when it is determined that the currently traversed mesh does not meet the boundary condition, for example, the boundary of the mesh is missing or irregular, the boundary processing algorithm is used to optimize the boundary of the mesh. In an embodiment, the boundary of the mesh can be optimized based on at least one of a boundary constraint algorithm, a boundary construction algorithm, and a boundary filling algorithm.

In step S4.4, at the end of the traversal, a target triangulated network is generated based on a preset data structure, and used as the 3D model of the underground goaf.

Specifically, the preset data structure includes at least one of a vertex-face index list, a half-edge data structure, and the like. In the current embodiment, the generated triangular mesh is saved as a suitable data structure for subsequent processing and rendering operations.

In the current embodiment, in a process of generating the triangular mesh, the mesh optimization algorithm is called to optimize the quality of the mesh and/or the boundary processing algorithm is called to optimize the mesh. This further improves 3D modeling precision and helps to improve the 3D imaging effect.

In an embodiment, the step S6 of calculating the BRDF of the target 3D model of the underground goaf based on the memory material texture attribute includes the following substeps:

In step S6.1, the material texture attribute of the target 3D model of the underground goaf is determined. The material texture attribute includes at least one of a rough material and a smooth material characterized by smoothness and specular reflection.

In step S6.2, when it is determined that the material texture attribute is the rough material, the BRDF of the target 3D model of the underground goaf is calculated according to a following first formula:

$$f_r(w_i, \omega_r) = \frac{\rho d}{\pi}$$

In the above formula, $f_r$ represents the obtained BRDF, $W_i$ represents a direction of incident light, $W_r$ represents a direction of emergent light, and $P_d$ represents a preset constant related to a material.

Specifically, when the material texture attribute is the rough material, the BRDF of the target 3D model of the underground goaf is calculated by using a common Lambertian model according to the above formula. The BRDF is specifically a function used to calculate a distribution of rays reflected on a surface, and is usually represented by a following formula:

$$f_r(w_p, w_p) = \frac{dL_r(w_r)}{dE_i(w_1)}$$

In the above formula, $dL_r(w_r)$ represents differential radiance of light reflected by the surface onto the direction $W_r$, $dE_i(w_1)$ represents differential irradiance of incident light from the direction $W_i$ on the surface, and E represents irradiance received by the surface.

In step S6.3, when it is determined that the material texture attribute is the smooth material, the BRDF of the target 3D model of the underground goaf is calculated according to a following second formula:

$$f_r(w_i, w_r) = \frac{k_d}{\pi} + \frac{k_s}{\pi} \cdot \left(\frac{n+2}{2}\right) \cdot (\cos\theta_h)^n$$

In the above formula, $k_d$ represents a coefficient of diffuse reflection, $k_s$ represents a coefficient of mirror reflection, n represents a reflectance parameter, and $\theta_h$ represents an angle between half-path vectors of a direction of an incident ray and a line-of-sight direction.

Specifically, when the material texture attribute is the smooth material, the BRDF of the target 3D model of the underground goaf is calculated by using a Blinn-Phong model according to the above formula.

In the above embodiments, appropriate calculation formulas are selected for different materials, which can further improve calculation accuracy of the BRDF and provide a good data support for analyzing characteristics of optical reflection subsequently.

In an embodiment, the step S7 of simulating the global illumination and constructing the rendering equation based on the obtained BRDF includes the following substeps:

In step S7.1, a light source is laid directly above the 3D model to simulate the global illumination.

It should be noted that the 3D model is presented on a computer screen through projection. The projection is a process of generating a light shadow, provided that there is a light source, an enclosed environment, an object, and a daylighting lens. The light source emits a ray and illuminates the object and an environment interface for reflection, projection, and the like. Finally, the ray is incident into the daylighting lens.

The above is a rendering process. After the enclosed environment and the object are obtained through the previous steps, it is necessary to set up the light source. In order to better simulate a lighting effect of an underground cavern, it is reasonable to set up the light source directly above the cavern. In addition, a location of the daylighting lens is determined by a visual angle of an observer and can be adjusted independently.

In step S7.2, based on the obtained BRDF, the rendering equation is constructed according to a following third formula:

$$L_o(p,\omega_0)=L_e(p,\omega_0)+\int_\Omega f_r(p,\omega_i,\omega_0)L_i(p,\omega_i)(\omega_i\cdot n)d\omega_i$$

In the above formula, $L_o(p,\omega_0)$ represents irradiance reflected by a point p on a surface of the object towards $\omega_0$; $L_e(p, \omega_0)$ represents irradiance emitted by the point p on the surface of the object towards the $\omega_0$; $f_r(p, \omega_i,\omega_0)$ represents a BRDF of the point p on the surface of the object; $L_i(p, \omega_i)$ represents irradiance received by the point p on the surface of the object from the $\omega_i$; $\omega_i\cdot n$ represents a dot product of the $\omega_i$ and the n; the $\omega_i$ represents the direction of the incident light, and the $\omega_0$ represents the direction of the emergent light; and Ω Q represents an upper hemisphere in which a point x is located, which is determined by a normal vector at the point x.

It should be noted that the rendering equation is a physical equation that describes propagation and interaction of the ray in a scene. A general form of the rendering equation is shown above. In specific implementation, the rendering equation may also be discretized to only retain self-illuminated light, direct light, and indirect light, in order to simplify the calculation and obtain an approximate solution.

In the above embodiments, ray tracing is performed in real time by using the constructed rendering equation. This can effectively reduce rendering time, increase an image display rate, and achieve a better real-time rendering result.

In an embodiment, referring to FIG. 2, the step S8 of making the setting to emit the ray from the viewpoint, and performing the ray tracing based on the rendering equation to obtain the high-brightness real scene image of the underground goaf includes the following substeps:

In step S8.1, a setting is made to emit a ray from each pixel in the daylighting lens.

Specifically, the ray can be emitted from the viewpoint of the camera along a line-of-sight direction of each pixel. In an embodiment, a start point and a direction of the ray can also be calculated based on parameters (such as a field-of-vision angle and an aspect ratio) of the camera.

In step S8.2, object intersection detection is performed for each emitted ray.

Specifically, for each emitted ray, the object intersection detection can be performed by using an intersection detection algorithm. In an embodiment, the intersection detection algorithm includes at least one of a ray-object intersection test algorithm (such as a ray-sphere intersection test algorithm and a ray-triangle intersection test algorithm), a distance field algorithm, and the like.

In step S8.3, when it is determined based on an obtained detection result that a corresponding emitted ray intersects the object in the scene, irradiance reflected by an intersection point towards the $\omega_0$ is calculated based on the rendering equation, and a reflected ray is traced.

Specifically, when it is determined that the corresponding emitted ray intersects the object in the scene, an attribute of the intersection point between the corresponding emitted ray and the object in the scene can also be calculated. The attribute of the intersection point includes at least one of a location, a normal, texture coordinates, and the like of the intersection point. It should be noted that the attribute is calculated to facilitate subsequent lighting calculation and coloring.

In step S8.4, when it is traced that the reflected ray at the corresponding intersection point can be directly reflected to the preset light source, a corresponding pixel point is located along the current reflected ray, and a reflection line between the light source and the corresponding pixel point is determined.

In step S8.5, a finally formed reflection line is determined for each pixel point, a RGB color and light intensity of each pixel point are determined based on the finally formed reflection line, and the real scene image of the underground goaf is presented based on the RGB color and the light intensity.

Specifically, for each pixel, a final image is generated based on intersection point information obtained through the ray tracing and a lighting calculation result. Various coloring techniques and lighting models can be used, such as the texture mapping, the diffuse reflection, and the mirror reflection.

In the above embodiments, a ray tracing algorithm is used for solving calculation, which can greatly increase a calculation speed, save computing power, and generate an image more quickly and in real time.

Figure 3:
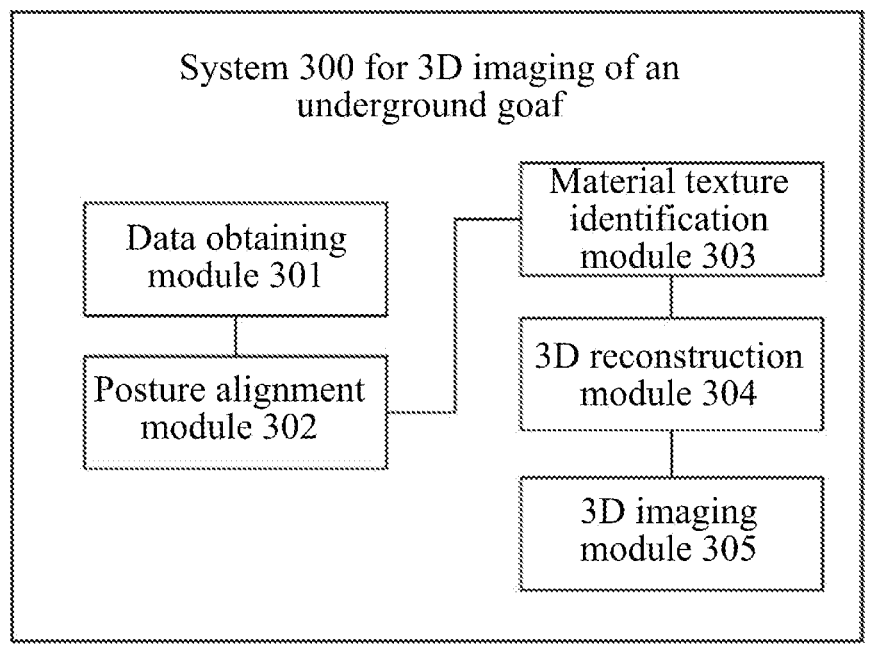
FIG. 3 is a schematic structural diagram of a system for 3D imaging of an underground goaf according to an embodiment of the present disclosure.

Referring to FIG. 3, the present disclosure provides a system 300 for 3D imaging of an underground goaf. The system 300 includes a data obtaining module 301, a posture alignment module 302, a material texture identification module 303, a 3D reconstruction module 304, and a 3D imaging module 305.

The data obtaining module 301 is configured to obtain a video image and point cloud data of an underground goaf.

The posture alignment module 302 is configured to determine a posture transformation matrix, and align the video image of the underground goaf and the point cloud data of the underground goaf based on the posture transformation matrix.

The material texture identification module 303 is configured to identify a material texture based on the video image of the underground goaf to obtain material texture information.

The 3D reconstruction module 304 is configured to divide the point cloud data of the underground goaf into triangular meshes to form an initial 3D model of the underground goaf.

The 3D reconstruction module 304 is further configured to map the material texture information onto the 3D model of the underground goaf to form a target 3D model with a material texture attribute for the underground goaf.

The 3D imaging module 305 is configured to calculate a BRDF of the target 3D model of the underground goaf based on the material texture attribute.

The 3D imaging module 305 is further configured to simulate global illumination, and construct a rendering equation based on the obtained BRDF.

The 3D imaging module 305 is further configured to make a setting to emit a ray from a viewpoint, and perform ray tracing based on the rendering equation to obtain a high-brightness real scene image of the underground goaf.

In an embodiment, each module in the system is also configured to execute the method in any optional implementation of the above embodiments.

From the above, it can be seen that the system for 3D imaging of an underground goaf in the present disclosure can generate a real-time 3D model of an underground goaf through joint imaging of a point cloud and a video image, to reflect a 3D contour and a real scene of the underground goaf. In addition, material texture identification is performed to further improve imaging precision and provide a good data foundation for subsequent 3D modeling, thereby achieving accurate texture mapping. Moreover, global illumination is also simulated, and ray tracing is performed based on an obtained rendering equation. This can greatly increase a calculation speed, save computing power, generate an image more quickly and in real time, and improve a 3D imaging effect of the underground goaf.

An embodiment of the present disclosure provides a readable storage medium storing a computer program. The computer program is executed by a processor to execute the method in any optional implementation of the above embodiments. The storage medium may be realized by any type of volatile or nonvolatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The readable storage medium can generate a real-time 3D model of an underground goaf through joint imaging of a point cloud and a video image, to reflect a 3D contour and a real scene of the underground goaf. In addition, material texture identification is performed to further improve imaging precision and provide a good data foundation for subsequent 3D modeling, thereby achieving accurate texture mapping. Moreover, global illumination is also simulated, and ray tracing is performed based on an obtained rendering equation. This can greatly increase a calculation speed, save computing power, generate an image more quickly and in real time, and improve a 3D imaging effect of the underground goaf.

In the embodiments provided in the present disclosure, it should be understood that the disclosed apparatus and method may be implemented in other manners. The described apparatus embodiment is merely schematic. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts shown as units may or may not be physical units, which may be located in one position, or may be distributed on a plurality of network units. Some or all of the units may be selected according to actual needs to achieve the objectives of the solutions of the embodiments.

In addition, all functional modules in the embodiments of the present disclosure may be integrated into one independent part, or each of the modules may exist alone physically, or two or more modules may be integrated into one independent part.

Relational terms herein such as "first" and "second" are merely used to distinguish one entity or operation from another entity or operation without necessarily requiring or implying any actual such relationship or order between such entities or operations.

The foregoing descriptions are merely embodiments of the present disclosure, and are not intended to limit the protection scope of the present disclosure. For a person skilled in the art, various modifications and changes may be made to the present disclosure. Any modifications, equivalents, improvements, and the like made within the spirit and principle of the present disclosure shall all fall within the protection scope of the present disclosure.

What is claimed is:

1. A method for three-dimensional (3D) imaging of an underground goaf, comprising:
   step S1, obtaining a video image and point cloud data of the underground goaf;
   step S2, determining a posture transformation matrix, and aligning the video image of the underground goaf and the point cloud data of the underground goaf based on the posture transformation matrix;
   step S3, identifying a material texture based on the video image of the underground goaf to obtain material texture information;
   step S4, dividing the point cloud data of the underground goaf into triangular meshes to form an initial 3D model of the underground goaf;
   step S5, mapping the material texture information onto the 3D model of the underground goaf to form a target 3D model with a material texture attribute for the underground goaf;
   step S6, calculating a bidirectional reflectance distribution function (BRDF) of the target 3D model of the underground goaf based on the material texture attribute;
   step S7, simulating global illumination, and constructing a rendering equation based on the obtained BRDF; and
   step S8, making a setting to emit a ray from a viewpoint, and performing ray tracing based on the rendering equation to obtain a high-brightness real scene image of the underground goaf;
   wherein the video image of the underground goaf is collected by a camera, and the point cloud data of the underground goaf is collected by a laser radar and a sonar;
   wherein the determining a posture transformation matrix, and aligning the video image of the underground goaf and the point cloud data of the underground goaf based on the posture transformation matrix in the step S2 comprises:
   step S2.1, preprocessing the video image of the underground goaf and the point cloud data of the underground goaf to obtain a target image and target point cloud data respectively;
   step S2.2, extracting a plurality of image feature descriptors from the target image and a plurality of point cloud feature descriptors from the target point cloud data;
   step S2.3, performing feature matching on each of the image feature descriptors and each of the point cloud feature descriptors through feature correlation to obtain a feature matching pair;
   step S2.4, estimating a posture transformation matrix of the camera based on the feature matching pair; and
   step S2.5, performing posture alignment on the target image and the target point cloud data based on the posture transformation matrix.

2. The method according to claim 1, wherein the identifying a material texture based on the video image of the underground goaf to obtain material texture information in the step S3 comprises:
   step S3.1, obtaining an image dataset containing different material textures, and constructing a training set and a verification set based on the image dataset;
   step S3.2, constructing an initial convolutional neural network (CNN), inputting the training set into the initial CNN for model training, and obtaining a target CNN at the end of the training;

step S3.3, evaluating a performance indicator of the target CNN based on the verification set, and performing model tuning based on an obtained indicator evaluation result; and step S3.4, inputting the video image of the underground goaf into the obtained tuned model for processing, and determining the material texture information based on an obtained output result.

3. The method according to claim 1, wherein the dividing the point cloud data of the underground goaf into triangular meshes to form the initial 3D model of the underground goaf in the step S4 comprises:

step S4.1, preprocessing the point cloud data of the underground goaf to obtain target point cloud data;

step S4.2, triangulating the target point cloud data to generate an initial triangulated network comprising a plurality of triangular meshes;

step S4.3, traversing each of the triangular meshes, and during the traversal, when a currently traversed mesh does not meet a preset quality condition and/or boundary condition, calling a mesh optimization algorithm to optimize quality of the mesh and/or calling a boundary processing algorithm to process a boundary of the mesh; and step S4.4, at the end of the traversal, generating a target triangulated network based on a preset data structure, and using the target triangulated network as the 3D model of the underground goaf.

4. The method according to claim 1, wherein the calculating a BRDF of the target 3D model of the underground goaf based on the material texture attribute in the step S6 comprises:

step S6.1, determining the material texture attribute of the target 3D model of the underground goaf, wherein the material texture attribute comprises at least one of a rough material and a smooth material with smoothness and specular reflection; and step S6.2, when the material texture attribute is the rough material, calculating the BRDF of the target 3D model of the underground goaf according to a following first formula:

$$f_r(w_i, \omega_r) = \frac{\rho d}{\pi}$$

wherein $f_r$ represents the obtained BRDF, $\omega_i$ represents a direction of incident light, $\omega_r$ represents a direction of emergent light, and $\rho_d$ represents a preset constant related to a material; and step S6.3, when the material texture attribute is the smooth material, calculating the BRDF of the target 3D model of the underground goaf according to a following second formula:

$$f_r(w_i, w_r) = \frac{k_d}{\pi} + \frac{k_s}{\pi} \cdot \left(\frac{n+2}{2}\right) \cdot (\cos\theta_h)^n$$

wherein $k_d$ represents a coefficient of diffuse reflection, $k_s$ represents a coefficient of mirror reflection, n represents a reflectance parameter, and $\theta_h$ represents an angle between half-path vectors of a direction of an incident ray and a line-of-sight direction.

5. The method according to claim 1, wherein the simulating global illumination, and constructing a rendering equation based on the obtained BRDF in the S7 comprises:

step S7.1, laying a light source directly above the 3D model to simulate the global illumination; and step S7.2, based on the obtained BRDF, constructing the rendering equation according to a following third formula:

$$L_0(p,\omega_0) = L_e(p,\omega_0) + \int_\Omega f_r(p,\omega_i,\omega_0) L_i(p,\omega_i)(\omega_i \cdot n) d\omega_i$$

wherein $L_0(p,\omega_0)$ represents irradiance reflected by a point p on a surface of an object towards $\omega_o$; $L_e(p,\omega_0)$ represents irradiance emitted by the point p on the surface of the object towards the $W_o$; $f_r(p,\omega_i,\omega_0)$ represents a BRDF of the point p on the surface of the object; $L_i(p, \omega_i)$ represents irradiance received by the point p on the surface of the object from $\omega_i$; $\omega_i \cdot n$ represents a dot product of the $\omega_i$ and n; the $\omega_i$ represents a direction of incident light, and the $\omega_o$ represents a direction of emergent light; and $\Omega$ represents an upper hemisphere in which a point x is located, which is determined by a normal vector at the point x.

6. The method according to claim 5, wherein the making a setting to emit a ray from a viewpoint, and performing ray tracing based on the rendering equation to obtain a high-brightness real scene image of the underground goaf in the step S8 comprises:

step S8.1, making a setting to emit a ray from each pixel in a daylighting lens;

step S8.2, performing object intersection detection for each emitted ray;

step S8.3, when determining, based on an obtained detection result, that a corresponding emitted ray intersects an object in a scene, calculating, based on the rendering equation, irradiance reflected by an intersection point towards the $W_o$, and tracing a reflected ray;

step S8.4, when it is traced that the reflected ray at the corresponding intersection point is directly reflected to the laid light source, locating a corresponding pixel point along the current reflected ray, and determining a reflection line between the light source and the corresponding pixel point; and step S8.5, determining a finally formed reflection line for each pixel point, determining a RGB color and light intensity of each pixel point based on the finally formed reflection line, and presenting the real scene image of the underground goaf based on the RGB color and the light intensity.

7. A system for 3D imaging of an underground goaf, comprising a data obtaining module, a posture alignment module, a material texture identification module, a 3D reconstruction module, and a 3D imaging module, wherein the data obtaining module is configured to obtain a video image and point cloud data of the underground goaf;

the posture alignment module is configured to determine a posture transformation matrix, and align the video image of the underground goaf and the point cloud data of the underground goaf based on the posture transformation matrix;

the material texture identification module is configured to identify a material texture based on the video image of the underground goaf to obtain material texture information;

the 3D reconstruction module is configured to divide the point cloud data of the underground goaf into triangular meshes to form an initial 3D model of the underground goaf;

the 3D reconstruction module is further configured to map the material texture information onto the 3D model of the underground goaf to form a target 3D model with a material texture attribute for the underground goaf;

the 3D imaging module is configured to calculate a BRDF of the target 3D model of the underground goaf based on the material texture attribute;

the 3D imaging module is further configured to simulate global illumination, and construct a rendering equation based on the obtained BRDF; and the 3D imaging module is further configured to make a setting to emit a ray from a viewpoint, and perform ray tracing based on the rendering equation to obtain a high-brightness real scene image of the underground goaf;

wherein the video image of the underground goaf is collected by a camera, and the point cloud data of the underground goaf is collected by a laser radar and a sonar;

wherein the determining a posture transformation matrix, and aligning the video image of the underground goaf and the point cloud data of the underground goaf based on the posture transformation matrix comprises:

preprocessing the video image of the underground goaf and the point cloud data of the underground goaf to obtain a target image and target point cloud data respectively;

extracting a plurality of image feature descriptors from the target image and a plurality of point cloud feature descriptors from the target point cloud data;

performing feature matching on each of the image feature descriptors and each of the point cloud feature descriptors through feature correlation to obtain a feature matching pair;

estimating a posture transformation matrix of the camera based on the feature matching pair; and performing posture alignment on the target image and the target point cloud data based on the posture transformation matrix.

8. A readable storage medium, wherein the readable storage medium comprises a program for 3D imaging of an underground goaf, and the program for 3D imaging of the underground goaf is executed by a processor to perform the steps of the method according to claim 1.

\* \* \* \* \*